(12) United States Patent
Nakamura et al.

(10) Patent No.: US 9,348,138 B2
(45) Date of Patent: May 24, 2016

(54) LASER PROCESSING DEVICE

(71) Applicant: MITSUBISHI ELECTRIC CORPORATION, Chiyoda-ku (JP)

(72) Inventors: Naoyuki Nakamura, Chiyoda-ku (JP); Tatsuya Yamamoto, Chiyoda-ku (JP); Junichi Nishimae, Chiyoda-ku (JP); Shuichi Fujikawa, Chiyoda-ku (JP); Masaki Seguchi, Chiyoda-ku (JP); Akinori Nishio, Chiyoda-ku (JP); Hiroyuki Murai, Nagoya (JP); Kenji Saruta, Nagoya (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 31 days.

(21) Appl. No.: 14/401,572

(22) PCT Filed: May 31, 2013

(86) PCT No.: PCT/JP2013/065214
§ 371 (c)(1),
(2) Date: Nov. 17, 2014

(87) PCT Pub. No.: WO2013/187259
PCT Pub. Date: Dec. 19, 2013

(65) Prior Publication Data
US 2015/0137004 A1    May 21, 2015

(30) Foreign Application Priority Data

Jun. 15, 2012  (JP) .................................. 2012-135988

(51) Int. Cl.
*G02B 26/00* (2006.01)
*G02B 27/00* (2006.01)
(Continued)

(52) U.S. Cl.
CPC ........... *G02B 27/0031* (2013.01); *B01J 19/121* (2013.01); *B23K 26/04* (2013.01); *B23K 26/0643* (2013.01); *B23K 26/0892* (2013.01); *G02B 26/00* (2013.01)

(58) Field of Classification Search
CPC ............................ G02B 26/00; G02B 27/0031
See application file for complete search history.

(56) References Cited

U.S. PATENT DOCUMENTS 4,480,169 A    10/1984   Macken
5,365,364 A *  11/1994   Taylor ................... G02B 26/10
                                              347/256

(Continued)

FOREIGN PATENT DOCUMENTS

JP     59-50421      3/1984
JP     5-305473      11/1993
(Continued)

OTHER PUBLICATIONS

International Search Report issued Jun. 25, 2013, in PCT/JP2013/065214, filed May 31, 2013.

*Primary Examiner* — Nicole Ippolito
*Assistant Examiner* — Sean Luck
(74) *Attorney, Agent, or Firm* — Oblon, McClelland, Maier & Neustadt, L.L.P.

(57) ABSTRACT

A laser processing device including: a laser oscillator; a processing table; a transmission optical system for transmitting laser light emitted from the laser oscillator to the processing table; a processing head for condensing and radiating the laser light transmitted via the transmission optical system to an object to be processed; a moving mechanism for changing a relative position between the object to be processed and the laser light to be radiated to the object to be processed; and a variable curvature spherical mirror. The transmission optical system includes a reflective beam expander mechanism for collimating and magnifying the laser light from the laser oscillator. The reflective beam expander mechanism includes a spherical mirror and a concave mirror having different curvatures in two orthogonal axes.

9 Claims, 8 Drawing Sheets

(51) Int. Cl.
  *B23K 26/04* (2014.01)
  *B01J 19/12* (2006.01)
  *B23K 26/06* (2014.01)
  *B23K 26/08* (2014.01)

(56) References Cited

U.S. PATENT DOCUMENTS

| | | | | |
|---|---|---|---|---|
| 5,506,858 | A * | 4/1996 | Takenaka | B23K 26/06 372/108 |
| 6,353,203 | B1 * | 3/2002 | Hokodate | B23K 26/032 219/121.67 |
| 7,229,178 | B1 * | 6/2007 | Headley | G02B 26/0825 359/847 |
| 2003/0184669 | A1 * | 10/2003 | Nishioka | G02B 7/102 348/335 |
| 2004/0001677 | A1 * | 1/2004 | Kondis | G02B 6/32 385/93 |
| 2004/0061917 | A1 * | 4/2004 | Mushika | G02B 3/0043 359/295 |
| 2004/0184163 | A1 * | 9/2004 | Nishioka | G02B 13/0045 359/726 |
| 2005/0259335 | A1 * | 11/2005 | Nishioka | G02B 26/0825 359/726 |
| 2007/0091481 | A1 * | 4/2007 | Chouji | G02B 26/0825 359/846 |
| 2007/0146676 | A1 * | 6/2007 | Tanitsu | G02B 26/008 355/71 |
| 2008/0068715 | A1 * | 3/2008 | Magarill | G03B 21/00 359/583 |
| 2009/0316251 | A1 * | 12/2009 | Griffin | G02B 26/0825 359/290 |
| 2010/0315605 | A1 * | 12/2010 | Arita | G02B 26/0816 353/98 |
| 2011/0032624 | A1 * | 2/2011 | Bolis | B81B 3/0021 359/666 |
| 2011/0042360 | A1 * | 2/2011 | Takahashi | B23K 26/046 219/121.62 |
| 2011/0102748 | A1 * | 5/2011 | Shevlin | G02B 26/0833 353/38 |
| 2011/0134552 | A1 * | 6/2011 | Kner | G02B 26/0825 359/847 |
| 2011/0147351 | A1 * | 6/2011 | Miyazaki | B23K 26/046 219/121.71 |
| 2011/0261431 | A1 * | 10/2011 | Conrad | B81B 3/0048 359/290 |

FOREIGN PATENT DOCUMENTS

| | | |
|---|---|---|
| JP | 6-277867 | 10/1994 |
| JP | 7-144291 | 6/1995 |
| JP | 8-252685 | 10/1996 |
| JP | 11-245074 | 9/1999 |
| JP | 2006-247676 | 9/2006 |
| JP | 2009-125761 | 6/2009 |

* cited by examiner

LASER PROCESSING DEVICE

TECHNICAL FIELD

The present invention relates to a laser processing device for processing an object to be processed by condensing and radiating laser light emitted from a laser oscillator to the object to be processed.

BACKGROUND ART

Hitherto, a laser processing device for processing an object to be processed by using laser light emitted from a laser oscillator has been well known (see, for example, Patent Literature 1).

FIG. 7 is a block diagram schematically illustrating an optical path configuration of a related-art laser processing device described in Patent Literature 1.

In FIG. 7, laser light L generated from a laser oscillator 1 is transmitted to a processing lens (not shown) in a processing head 4 via a transmission optical system to be condensed and radiated to an object to be processed (not shown) placed on a processing table 2.

The processing table 2 and the processing head 4 include moving means 5 capable of moving each of the processing table 2 and the processing head 4 in at least one axial direction. The moving means 5 can move a relative position between the laser light L and the object to be processed in a desired direction and can locate the relative position at a desired position.

In this case, the moving means 5 is configured to move the processing table 2 in an X axis direction and to move the processing head 4 in a Y axis direction.

The transmission optical system for the laser light L includes a reflective beam expander mechanism 106 that the laser light L from the laser oscillator 1 enters, and a reflection mirror 8 for introducing the laser light L emitted from the reflective beam expander mechanism 106 into the processing head 4.

The reflective beam expander mechanism 106 includes a reflection mirror 68 that the laser light L from the laser oscillator 1 enters, a spherical convex mirror 63 that the laser light L reflected by the reflection mirror 68 enters, and a spherical concave mirror 65 that the laser light L reflected by the spherical convex mirror 63 enters.

The reflective beam expander mechanism 106 increases a beam diameter of the laser light L by a desired scaling factor irrespective of a divergence angle of the laser light L generated from the laser oscillator 1, and maintains an appropriate condensed light diameter at a processing point on the processing table 2.

It is known that, generally, astigmatism in accordance with an incident angle occurs in light reflected by a spherical mirror such as the spherical convex mirror 63 or the spherical concave mirror 65. In particular, when astigmatism occurs in the laser light L in a laser processing device, the light condensation ability is reduced and the beam shape becomes anisotropic at the processing point.

In this way, in a laser processing device of a type in which the processing head 4 moves, the reflective beam expander mechanism 106 for magnifying and collimating the laser light L is provided in the optical path in order to maintain an appropriate condensed light diameter at the processing point of the object to be processed. When a spherical mirror is used in the reflective beam expander mechanism 106, in order to inhibit astigmatism, it is necessary to restrict the incident angle with respect to the spherical mirror to an acute angle.

Therefore, when a spherical mirror is used in the transmission optical system of the laser processing device, in order to avoid lowering of processing quality and occurrence of anisotropy in processing due to astigmatism, it is necessary to restrict the incident angle of the laser light L with respect to the spherical mirror to an acute angle so that the astigmatism does not adversely affect the processing quality.

It is known that, generally, when the incident angle with respect to the spherical mirror is set to be an acute angle (desirably 15° or less), lowering of the processing quality due to astigmatism is negligible.

Therefore, in FIG. 7 (Patent Literature 1), the reflection mirror 68 in the reflective beam expander mechanism 106 restricts incident angles of the laser light L with respect to the spherical mirrors (spherical convex mirror 63 and spherical concave mirror 65) to acute angles, respectively.

However, when the reflection mirror 68 for restricting the incident angles with respect to the spherical mirrors is provided, the optical path is complicated, and further, in a strict sense, the astigmatism cannot be inhibited. Further, through absorption of the laser light by optical elements in the complicated optical path, the thermal lens effect is produced, and thus increase in the number of the optical elements is a factor of processing instability.

CITATION LIST

Patent Literature

[PTL 1] JP 05-305473 A

SUMMARY OF INVENTION

Technical Problems

In the related-art laser processing device, when the reflective beam expander mechanism including the spherical mirror is used as the transmission optical system, the reflection mirror for restricting the incident angle with respect to the spherical mirror is provided as in Patent Literature 1, but there are problems in that the optical path configuration is complicated and, in addition, that astigmatism cannot be satisfactorily inhibited.

The present invention has been made in order to solve the above-mentioned problems, and an object of the present invention is to obtain a laser processing device capable of satisfactorily restricting a beam divergence angle and radiating laser light without aberration and having a desired beam diameter to an object to be processed by using a reflective beam expander mechanism whose optical path configuration is not particularly complicated.

Solution to Problems

According to one embodiment of the present invention, there is provided a laser processing device, including: a laser oscillator for emitting laser light; a processing table for placing an object to be processed; a transmission optical system for transmitting the laser light emitted from the laser oscillator to the processing table; a processing head for condensing and radiating the laser light transmitted via the transmission optical system to the object to be processed; and moving means for changing a relative position between the object to be processed and the laser light to be radiated to the object to be processed, in which the transmission optical system includes: a reflective beam expander mechanism for collimating and magnifying the laser light from the laser oscillator;

and a variable curvature spherical mirror, in which the reflective beam expander mechanism includes a spherical mirror and a mirror having different curvatures in two orthogonal axes, and in which the variable curvature spherical mirror is placed between the spherical mirror and the mirror having different curvatures in two orthogonal axes.

Advantageous Effects of Invention

According to one embodiment of the present invention, in the reflective beam expander mechanism constructing the transmission optical system, by using the mirror having different curvatures in two orthogonal axes, the beam divergence angle can be satisfactorily restricted and the laser light without aberration and having a desired beam diameter can be radiated to the object to be processed, without using the transmission optical system having a particularly complicated structure.

DESCRIPTION OF EMBODIMENTS

First Embodiment

Figure 1:
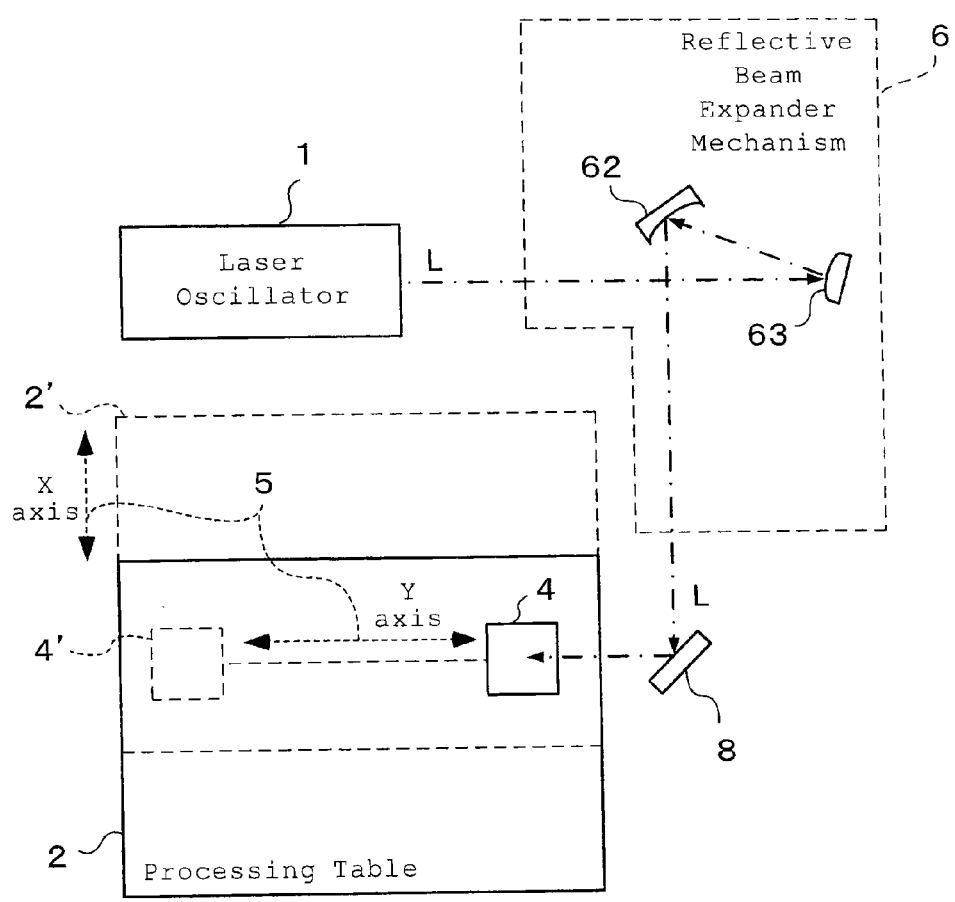
FIG. 1 is a block diagram schematically illustrating an optical path configuration of a laser processing device according to a first embodiment of the present invention.

FIG. 1 is a block diagram schematically illustrating an optical path configuration of a laser processing device according to a first embodiment of the present invention.

In FIG. 1, the laser processing device according to the first embodiment of the present invention includes a laser oscillator 1 that emits laser light L, a processing table 2 on which an object to be processed (not shown) is placed, a transmission optical system including a reflective beam expander mechanism 6 and a reflection mirror 8, and a processing head 4 that radiates the laser light L that has passed through the transmission optical system to the object to be processed.

The laser light L emitted from the laser oscillator 1 is collimated and magnified by the reflective beam expander mechanism 6 provided in the transmission optical system, and then is introduced into the processing head 4 by the reflection mirror 8. After that, the laser light L is condensed by a processing lens (not shown) in the processing head 4, and then is radiated to the object to be processed on the processing table 2.

Moving means 5 is provided to the processing table 2 and the processing head 4. The moving means 5 horizontally moves the processing table 2 and the processing head 4 in ranges from positions indicated by the solid lines to positions 2' and 4' indicated by the dotted lines, respectively.

The moving means 5 moves the processing table 2 in an X axis (dotted arrow) direction and moves the processing head 4 in a Y axis (dotted arrow) direction under the control of control means (not shown), thereby changing a relative position between the laser light L and the object to be processed to enable processing at a desired position to be processed.

Note that, in FIG. 1, in order to adjust the relative position between the laser light L and the object to be processed, the moving means 5 for changing the relative position between the processing table 2 and the processing head 4 is used, but moving means for driving only the processing head 4 may also be used.

The reflective beam expander mechanism 6 includes at least one mirror having different curvatures in two orthogonal axes.

In FIG. 1, the reflective beam expander mechanism 6 includes a spherical convex mirror 63 that reflects the laser light L from the laser oscillator 1 and a concave mirror 62 having different curvatures in two orthogonal axes.

The two orthogonal axes of the concave mirror 62 have curvatures different from each other, and the concave mirror 62 further reflects the laser light L reflected by the spherical convex mirror 63 to cause the laser light L to enter the reflection mirror 8 on the processing table 2 side.

Note that, in this case, the concave mirror 62 having different curvatures in two orthogonal axes and the spherical convex mirror 63 are used in the reflective beam expander mechanism 6, but a convex mirror having different curvatures in two orthogonal axes and a spherical concave mirror may also be used.

Further, the arrangement order of the concave mirror 62 and the spherical convex mirror 63 is not limited to that in the configuration illustrated in FIG. 1, and the arrangement order of the mirrors may be set in reverse order.

As the simplest reflective beam expander mechanism that collimates and increases the beam diameter of the laser light L, it is conceivable to use a spherical convex mirror and a spherical concave mirror, but, as described above, astigmatism in accordance with an incident angle occurs in light reflected by a spherical mirror, and processing quality is significantly lowered due to the anisotropic beam shape and degraded light condensation ability caused by the astigmatism.

On the other hand, in the first embodiment of the present invention, the concave mirror 62 having different curvatures in two orthogonal axes is used in the reflective beam expander mechanism 6, and the curvatures of the two axes of the concave mirror 62 are designed so that aberration is not caused in the reflected light.

As a result, no restriction is imposed on the incident angle of the laser light L, and thus an optical path design that uses the concave mirror 62 as a reflection mirror is possible. Thus, the beam diameter can be magnified and collimated not only without restricting the incident angle on the spherical convex mirror 63 but also without causing astigmatism.

As described above, the laser processing device according to the first embodiment (FIG. 1) of the present invention includes the laser oscillator 1 for emitting the laser light L, the processing table 2 on which the object to be processed is placed, the transmission optical system for transmitting the laser light L emitted from the laser oscillator 1 to the processing table 2, the processing head 4 for condensing and radiating the laser light L transmitted via the transmission optical system to the object to be processed, and the moving means 5 for changing the relative position between the object to be processed and the laser light L to be radiated to the object to be processed.

The transmission optical system includes the reflective beam expander mechanism 6 for collimating and magnifying the laser light L from the laser oscillator 1, and the reflective beam expander mechanism 6 includes a mirror having different curvatures in two orthogonal axes.

The reflective beam expander mechanism 6 includes the spherical convex mirror 63 and the concave mirror 62 having different curvatures in two orthogonal axes. Alternatively, the reflective beam expander mechanism 6 includes a spherical concave mirror and a convex mirror having different curvatures in two orthogonal axes.

By using a mirror designed so that two orthogonal axes thereof have curvatures different from each other so as to inhibit aberration when reflecting light in the reflective beam expander mechanism 6 for magnifying and collimating the laser light L in this way, a beam divergence angle can be satisfactorily restricted and the laser light L without aberration and having a desired beam diameter can be radiated to an object to be processed by using the reflective beam expander mechanism 6 whose optical path configuration is not particularly complicated.

Further, no restriction is imposed on the incident angle of the laser light L with respect to the mirror having different curvatures in two orthogonal axes, and thus the optical path design flexibility is enhanced and the optical system is simplified.

Figure 7:
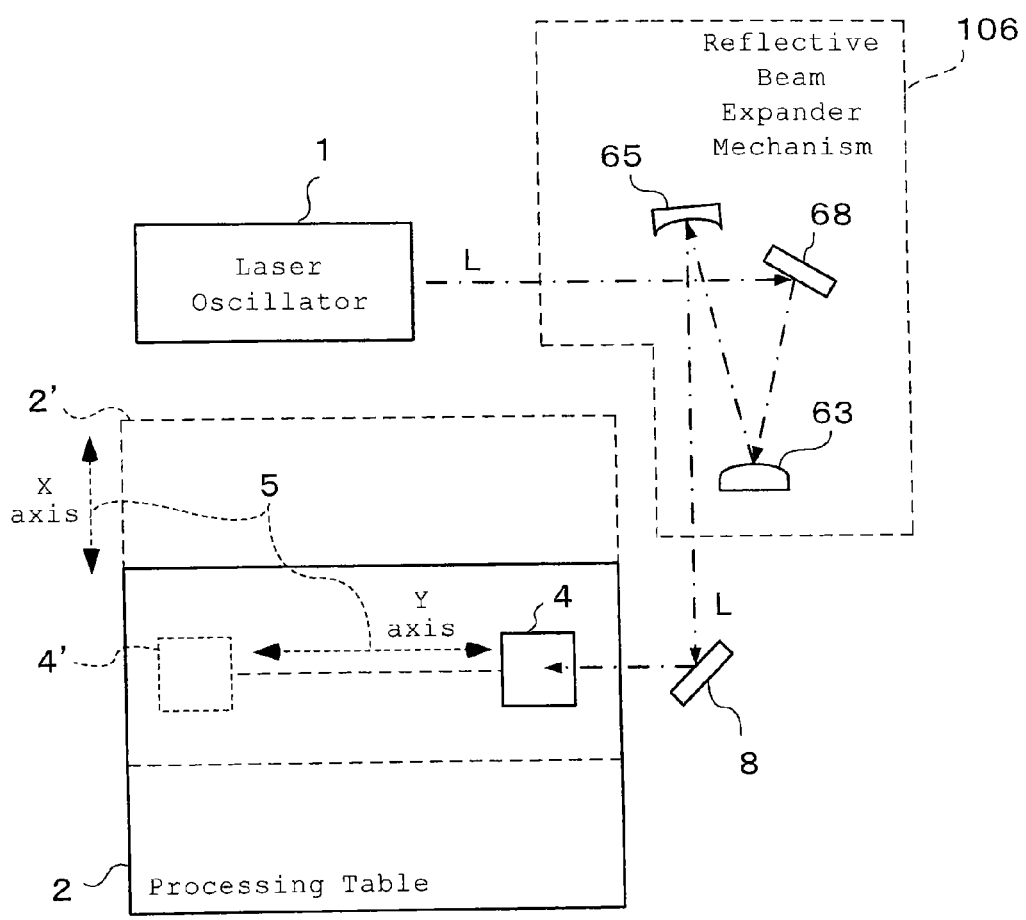
FIG. 7 is a block diagram schematically illustrating an optical path configuration of a related-art laser processing device.

Further, the reflection mirror 68 for restricting the incident angle with respect to a spherical mirror as in the related-art device (FIG. 7) can be eliminated and the number of optical elements in the transmission optical system can be reduced to simplify the optical structure. Thus, influence of the thermal lens effect of the optical elements is reduced, which enables stable processing over a long period of time.

Note that, in FIG. 1, in order to inhibit aberration during reflection, the incident angle of the laser light L with respect to the spherical convex mirror 63 is restricted to an acute angle. However, when the curvatures of the concave mirror 62 are designed so that astigmatism that occurs when the concave mirror 62 gives reflection and astigmatism of reflected light that occurs in accordance with the incident angle with respect to the spherical mirror 63 are canceled out, the incident angle of the laser light L with respect to the spherical convex mirror 63 is not restricted to an acute angle.

Second Embodiment

Figure 2:
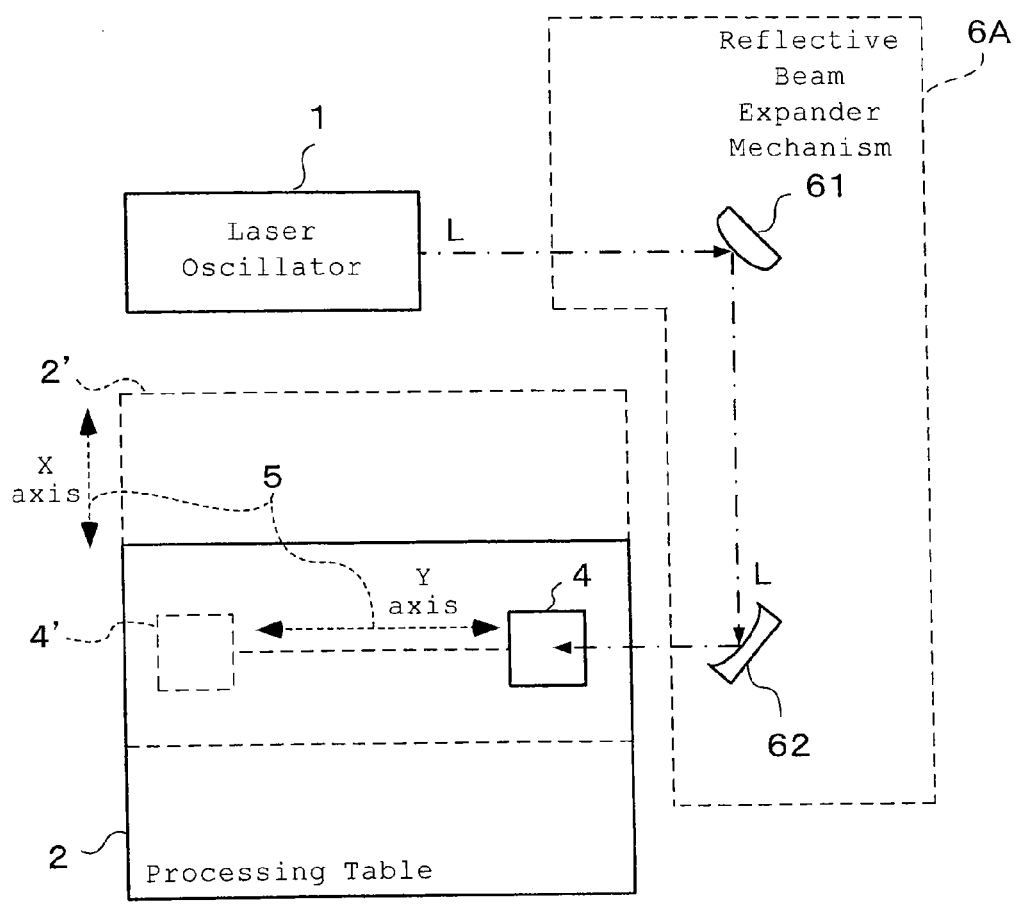
FIG. 2 is a block diagram schematically illustrating an optical path configuration of a laser processing device according to a second embodiment of the present invention.

Note that, in the above-mentioned first embodiment (FIG. 1), the reflective beam expander mechanism 6 including the concave mirror 62 having different curvatures in two orthogonal axes and the spherical convex mirror 63 is used, but, as illustrated in FIG. 2, a reflective beam expander mechanism 6A including a convex mirror 61 having different curvatures in two orthogonal axes and the concave mirror 62 having different curvatures in two orthogonal axes may also be used.

FIG. 2 is a block diagram schematically illustrating an optical path configuration of a laser processing device according to a second embodiment of the present invention. The same components as those described above (see FIG. 1) are denoted by the same reference symbols as those described above, and detailed description thereof is omitted herein.

In FIG. 2, the reflective beam expander mechanism 6A includes the convex mirror 61 having different curvatures in two orthogonal axes and the concave mirror 62 having different curvatures in two orthogonal axes.

In the reflective beam expander mechanism 6 described above (FIG. 1), only one mirror having different curvatures in two orthogonal axes is used, but, in the reflective beam expander mechanism 6A according to the second embodiment (FIG. 2) of the present invention, two mirrors each having different curvatures in two orthogonal axes (convex mirror 61 and concave mirror 62) are used.

By using two mirrors each having different curvatures in two orthogonal axes in the reflective beam expander mechanism 6A in this way, no restriction is imposed on the incident angles of the laser light L with respect to the mirrors in the reflective beam expander mechanism 6A. Thus, the optical path design flexibility is enhanced and the reflection mirror 68 for restricting the incident angle becomes unnecessary, which reduces the influence of the thermal lens effect to stabilize the processing precision.

Further, all the mirrors in the transmission optical system can be used as reflection mirrors, and thus the reflection mirror 8 on the processing table 2 side becomes unnecessary. Thus, the transmission optical system can be further simplified.

Further, the influence of the thermal lens effect of the optical elements is further reduced, which enables stable processing over a long period of time.

Third Embodiment

Figure 3:
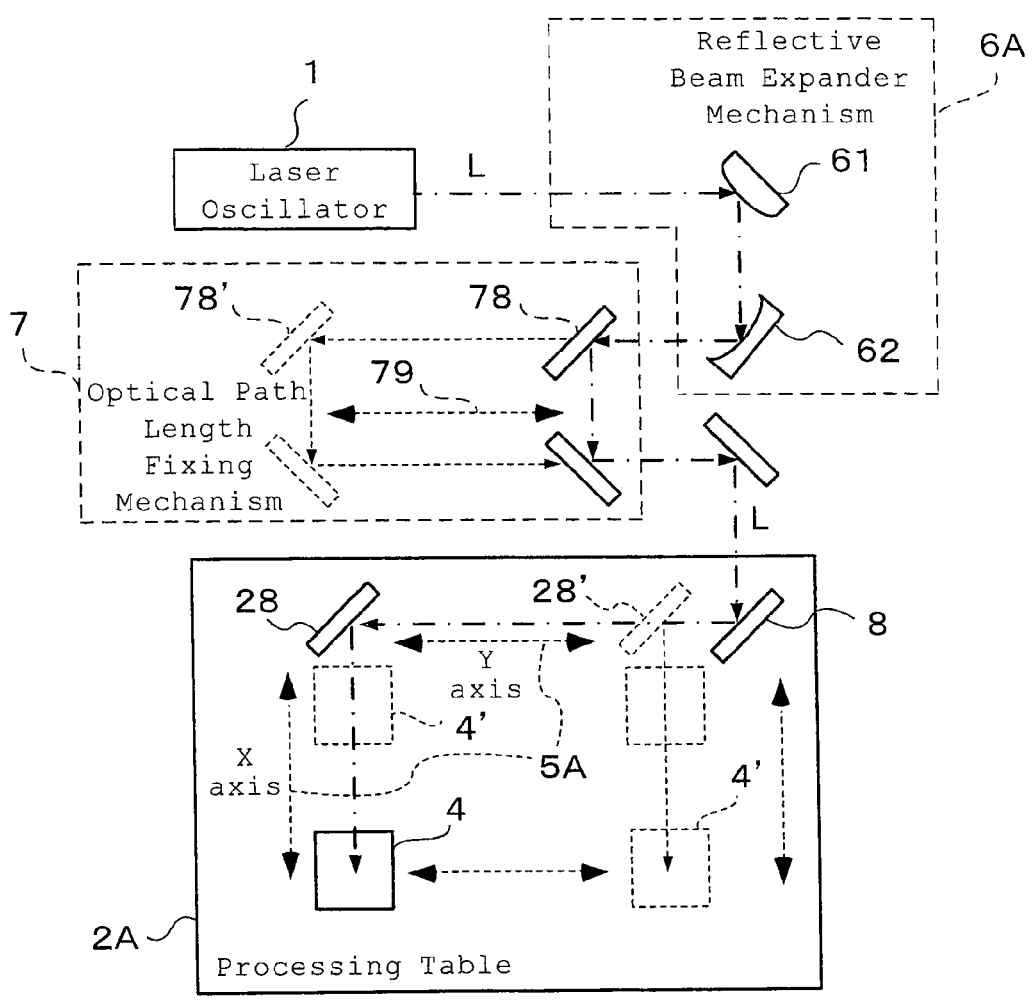
FIG. 3 is a block diagram schematically illustrating an optical path configuration of a laser processing device according to a third embodiment of the present invention.

Note that, in the above-mentioned first and second embodiments (FIG. 1 and FIG. 2), the processing table 2 movable in the X axis direction is used, but an immovable processing table 2A may also be used as illustrated in FIG. 3.

FIG. 3 is a block diagram schematically illustrating an optical path configuration of a laser processing device according to a third embodiment of the present invention. The same components as those described above (see FIG. 1 and FIG. 2) are denoted by the same reference symbols as those described above, and detailed description thereof is omitted herein.

In FIG. 3, moving means 5A is provided to the processing head 4 on the processing table 2A, for moving the processing head 4 in the X axis direction and in the Y axis direction in ranges from the position indicated by the solid lines to positions 4' indicated by the dotted lines.

Further, in the transmission optical system for the laser light L, an optical path length fixing mechanism 7 is inserted between the reflective beam expander mechanism 6A and the reflection mirror 8 on the processing table 2A side.

In this case, the processing table 2A is larger than the processing table 2 described above and has a processing region larger than that of the processing table 2. It is not efficient to drive the processing table 2A, and hence the moving means 5A changes the relative position between the laser light L and an object to be processed only by driving the processing head 4.

Note that, when the processing head 4 is moved in the Y axis direction, a reflection mirror 28 is also moved in a range from a position indicated by the solid lines to a position 28' indicated by the dotted lines.

Further, under this state, an optical path length of the laser light L from the laser oscillator 1 to the processing head 4 greatly differs depending on a processing position on the processing table 2A, which may cause an error in the condensed light diameter of a beam radiated to an object to be processed. Therefore, the optical path length fixing mechanism 7 for cancelling out fluctuations in optical path length to make compensation is provided.

The optical path length fixing mechanism 7 includes a mirror group 78 including a plurality of mirrors for causing a direction of travel of incident light and a direction of travel of output light to be opposite and in parallel to each other.

Further, the optical path length fixing mechanism 7 includes a moving mechanism 79 for translating the mirror group 78 in a range from a position indicated by the solid lines to a position 78' indicated by the dotted lines.

The moving mechanism 79 adjusts, under the control of control means (not shown), the optical path length of the laser light L to be always at a predetermined value by moving the position of the mirror group 78 so as to cancel out change in optical path length caused by the movement of the processing head 4.

Note that, in FIG. 3, the optical path length fixing mechanism 7 is used with respect to the processing table 2A that changes the relative position between the laser light L and an object to be processed only by moving the processing head 4, but the optical path length fixing mechanism 7 can also be applied to a configuration in which both the processing head 4 and the processing table 2 are moved as described above (FIG. 1 and FIG. 2).

Further, a case where the reflective beam expander mechanism 6A according to the above-mentioned second embodiment (FIG. 2) is used is described, but this embodiment is similarly applicable to a case where the reflective beam expander mechanism 6 according to the above-mentioned first embodiment (FIG. 1) is used.

The laser light L emitted from the reflective beam expander mechanism 6A is collimated, and thus the condensed light diameter of the laser light L radiated to an object to be processed on the processing table 2A ideally does not change even when the optical path length changes. However, in a strict sense, it is impossible to completely restrict the divergence angle, and thus increase in condensed light diameter along with the increase in optical path length cannot be completely avoided.

On the other hand, by inserting the optical path length fixing mechanism 7 as illustrated in FIG. 3, even a laser processing device using the large processing table 2A causing the optical path length to be larger can maintain a fixed condensed light diameter on the processing table 2A, and the processing quality can be maintained.

As described above, the transmission optical system according to the third embodiment (FIG. 3) of the present invention includes the optical path length fixing mechanism 7, and the optical path length fixing mechanism 7 includes the mirror group 78 constructed by a plurality of mirrors and the moving mechanism 79 for translating the mirror group 78. The plurality of mirrors constructing the mirror group 78 are placed so that the direction of travel of incident light to the mirror group 78 and the direction of travel of output light from the mirror group 78 are opposite and in parallel to each other.

Further, the moving mechanism 79 translates the mirror group 78 with respect to the directions of travel of the incident light and the output light so as to cancel out change in relative position between the laser light L to be radiated to an object to be processed and the object to be processed to maintain a fixed optical path length of the laser light L radiated to the object to be processed.

The optical path length fixing mechanism 7 is provided in this way, and hence the condensed light diameter of the laser light L radiated to an object to be processed can be maintained independently of the relative position between the laser light L and the object to be processed, and thus high quality processing can be maintained.

Fourth Embodiment

Figure 4:
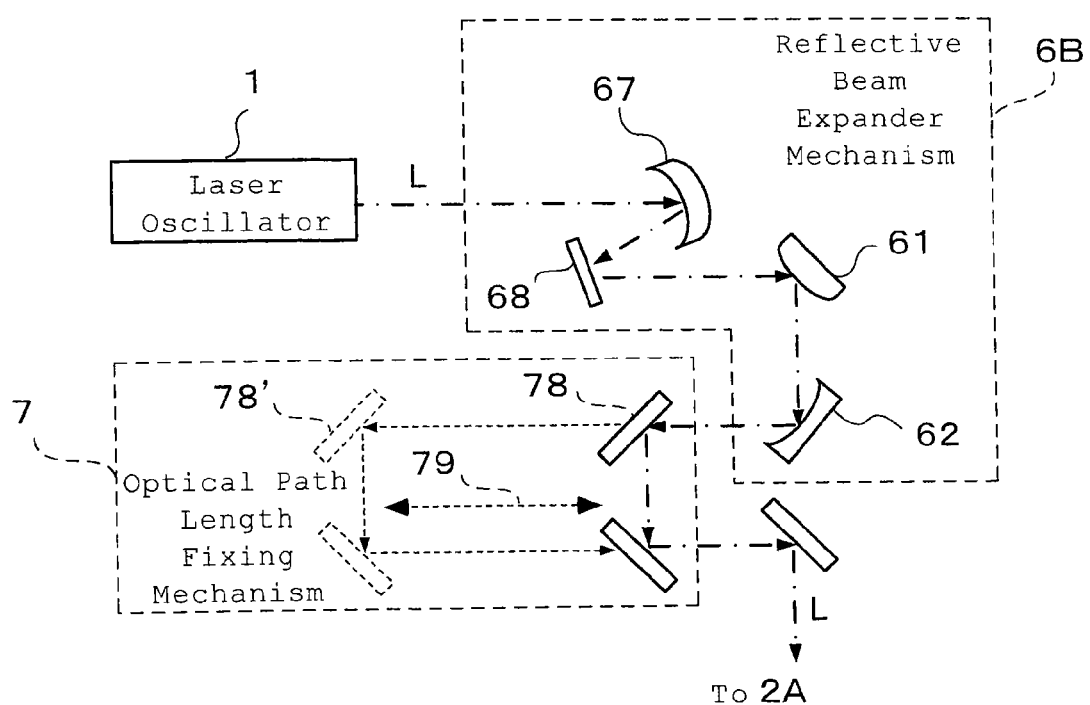
FIG. 4 is a block diagram schematically illustrating a principal part of a laser processing device according to a fourth embodiment of the present invention.

Note that, in the above-mentioned third embodiment (FIG. 3), the reflective beam expander mechanism 6A including the convex mirror 61 having different curvatures in two orthogonal axes and the concave mirror 62 having different curvatures in two orthogonal axes is used, but, as illustrated in FIG. 4, a reflective beam expander mechanism 6B including the concave mirror 62 having different curvatures in two orthogonal axes, the spherical convex mirror 63, a variable curvature spherical mirror 67, and the reflection mirror 68 may also be used.

FIG. 4 is a block diagram schematically illustrating a principal part of a laser processing device according to a fourth embodiment of the present invention. The same components as those described above (see FIG. 1 to FIG. 3) are denoted by the same reference symbols as those described above, and detailed description thereof is omitted herein.

In FIG. 4, the reflective beam expander mechanism 6B according to the fourth embodiment of the present invention includes, as a transmission optical system, the variable curvature spherical mirror 67 that reflects the laser light L from the laser oscillator 1, the reflection mirror 68 that reflects the laser light L reflected by the variable curvature spherical mirror 67, and the convex mirror 61 and the concave mirror 62 that reflect the laser light L reflected by the reflection mirror 68. Two orthogonal axes of each of the convex mirror 61 and the concave mirror 62 have curvatures different from each other.

The concave mirror 62 having different curvatures in two orthogonal axes reflects and introduces, into the optical path length fixing mechanism 7, the laser light L reflected by the convex mirror 63 having different curvatures in two orthogonal axes.

Note that, the arrangement order of the variable curvature spherical mirror 67 and the reflection mirror 68 is not limited to that in the configuration illustrated in FIG. 4, and the arrangement order of the mirrors may be set in reverse order.

With the reflection mirror 68, it is possible to restrict the incident angle of the laser light L with respect to the variable curvature spherical mirror 67 so as to inhibit astigmatism that occurs in the laser light L reflected by the variable curvature spherical mirror 67 to a range in which the processing quality is not influenced.

In the above-mentioned first to third embodiments (FIG. 1 to FIG. 3), the condensed light diameter of the laser light L at a processing point on an object to be processed is fixed, but by providing the variable curvature spherical mirror 67 in the reflective beam expander mechanism 6B as illustrated in FIG. 4, the condensed light diameter of the laser light can be changed.

In general, in drilling processing such as piercing processing, by appropriately changing the condensed light diameter during the processing, processing at higher speed can be carried out compared with a case where the condensed light diameter is fixed.

Further, in processing a corner portion or the like, heat is liable to accumulate in the object to be processed and a cut surface may become rough, but by changing the condensed light diameter during the processing to change the range of irradiation of the laser light to the object to be processed, high quality and high precision processing can be carried out.

As described above, the transmission optical system according to the fourth embodiment (FIG. 4) of the present invention includes the variable curvature spherical mirror 67 and can change the condensed light diameter of the laser light L radiated to an object to be processed, and hence, processing at higher speed and with higher quality can be realized.

Fifth Embodiment

Figure 5:
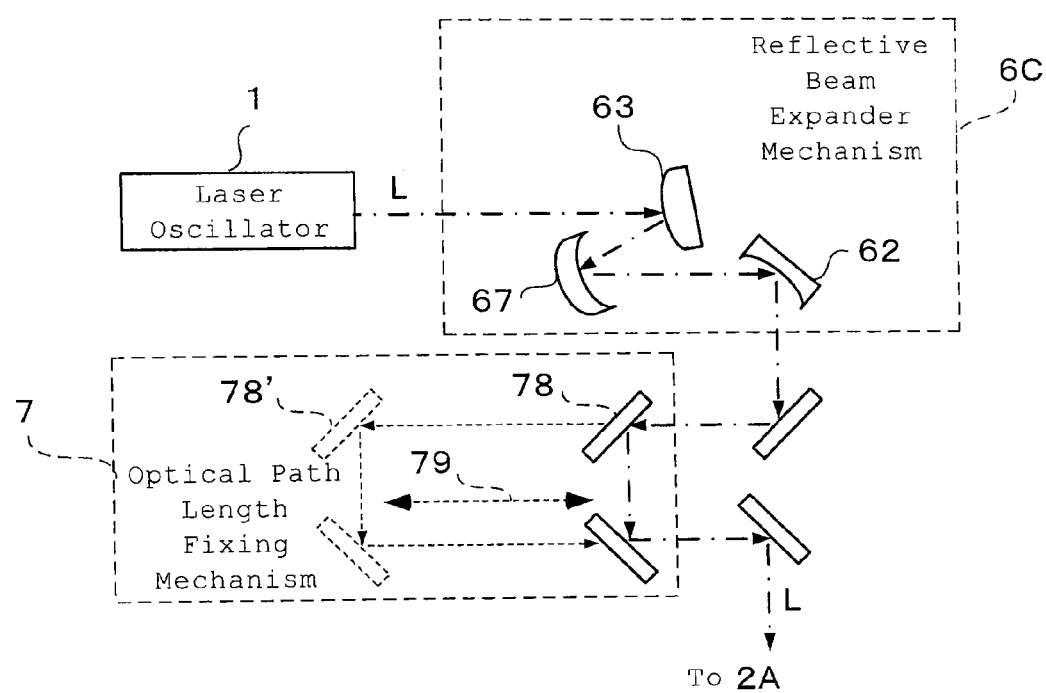
FIG. 5 is a block diagram schematically illustrating a principal part of a laser processing device according to a fifth embodiment of the present invention.

Note that, in the above-mentioned fourth embodiment (FIG. 4), the reflective beam expander mechanism 6B including the reflection mirror 68 is used, but, as illustrated in FIG. 5, a reflective beam expander mechanism 6C that does not require the reflection mirror 68 may also be used.

FIG. 5 is a block diagram schematically illustrating a principal part of a laser processing device according to a fifth embodiment of the present invention. The same components as those described above (see FIG. 4) are denoted by the same reference symbols as those described above, and detailed description thereof is omitted herein.

In FIG. 5, the reflective beam expander mechanism 6C according to the fifth embodiment of the present invention includes, as a transmission optical system, the spherical convex mirror 63 that reflects the laser light L from the laser oscillator 1, the variable curvature spherical mirror 67 that reflects the laser light L reflected by the spherical convex mirror 63, and the concave mirror 62 having different curvatures in two orthogonal axes.

The spherical convex mirror 63 and the variable curvature spherical mirror 67 are placed so as to be substantially opposed to each other so that the laser light L that has entered the corresponding mirror is emitted to an opposite direction.

The concave mirror 62 reflects the laser light L reflected by the variable curvature spherical mirror 67 to introduce the laser light L to the optical path length fixing mechanism 7 side.

The reflective beam expander mechanism 6B described above (FIG. 4) requires the reflection mirror 68 for restricting the incident angle with respect to the variable curvature spherical mirror 67 in order to inhibit astigmatism. The reflective beam expander mechanism 6C illustrated in FIG. 5 does not require the reflection mirror 68, because the spherical convex mirror 63 is placed on an incident side of the variable curvature spherical mirror 67 and the variable curvature spherical mirror 67 and the spherical convex mirror 63 are placed so as to be opposed to each other.

Specifically, by using the reflective beam expander mechanism 6C illustrated in FIG. 5, the reflection mirror 68 is unnecessary and the incident angles of the laser light L with respect to the variable curvature spherical mirror 67 and the spherical convex mirror 63, respectively, can be restricted to a range in which astigmatism does not influence the processing quality.

Further, simplification of the transmission optical system reduces the influence of thermal lenses of the optical elements, and thus, stable processing can be realized. Further, because the transmission optical system is simplified, the optical path design flexibility can be enhanced.

As described above, the reflective beam expander mechanism 6C according to the fifth embodiment (FIG. 5) of the present invention includes the variable curvature spherical mirror 67 and the spherical convex mirror 63 (spherical mirror), and the variable curvature spherical mirror 67 is placed so as to be opposed to the spherical convex mirror 63 in the reflective beam expander mechanism 6C.

This improves the processing precision as in the above description, and by placing the spherical convex mirror 63 and the variable curvature spherical mirror 67 so as to be opposed to each other, the reflection mirror 68 for restricting the incident angles of the laser light L with respect to the mirrors to acute angles, respectively, becomes unnecessary. Thus, the processing can be stabilized through simplification of the optical path and reduction in thermal lens effect.

Sixth Embodiment

Figure 6:
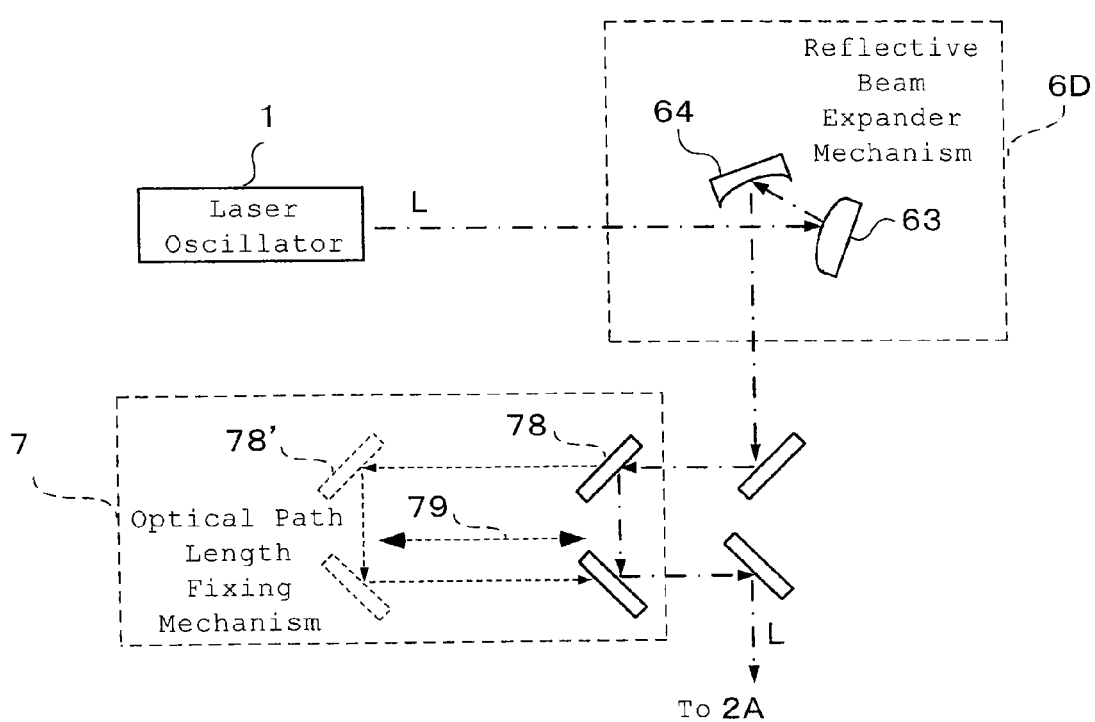
FIG. 6 is a block diagram schematically illustrating a principal part of a laser processing device according to a sixth embodiment of the present invention.

Note that, in the above-mentioned fifth embodiment (FIG. 5), the reflective beam expander mechanism 6C including the concave mirror 62 having different curvatures in two orthogonal axes and the variable curvature spherical mirror 67 is used, but, as illustrated in FIG. 6, a reflective beam expander mechanism 6D including a variable curvature mirror 64 having changeable curvatures in two orthogonal axes may also be used.

FIG. 6 is a block diagram schematically illustrating a principal part of a laser processing device according to a sixth embodiment of the present invention. The same components as those described above (see FIG. 5) are denoted by the same reference symbols as those described above, and detailed description thereof is omitted herein.

In FIG. 6, the reflective beam expander mechanism 6D according to the sixth embodiment of the present invention includes, as a transmission optical system, the spherical convex mirror 63 that reflects the laser light L from the laser oscillator 1 and the variable curvature mirror 64 having changeable curvatures in two orthogonal axes.

The variable curvature mirror 64 having changeable curvatures in two orthogonal axes has the function of both the concave mirror 62 having different curvatures in two orthogonal axes and the variable curvature spherical mirror 67 described above (FIG. 5), and the variable curvature mirror 64 reflects the laser light L reflected by the spherical convex mirror 63 to introduce the laser light L to the optical path length fixing mechanism 7 side.

By using the reflective beam expander mechanism 6D illustrated in FIG. 6, the transmission optical system is simplified and the number of the optical elements is reduced. Thus, the influence of thermal lenses can be further reduced, and in addition, stable processing can be realized. Further, the transmission optical system is simplified, and hence the optical path design flexibility can be enhanced.

As described above, the reflective beam expander mechanism 6D according to the sixth embodiment (FIG. 6) of the present invention includes the variable curvature mirror 64 having changeable curvatures in two orthogonal axes. With the variable curvature mirror 64, both the mirror having different curvatures in two orthogonal axes and the variable curvature spherical mirror described above can be collected as a single optical element.

Therefore, the number of the optical elements can be reduced, and the stabilization of the processing precision can be realized through simplification of the optical path and reduction in thermal lens effect.

Seventh Embodiment

Figure 8:
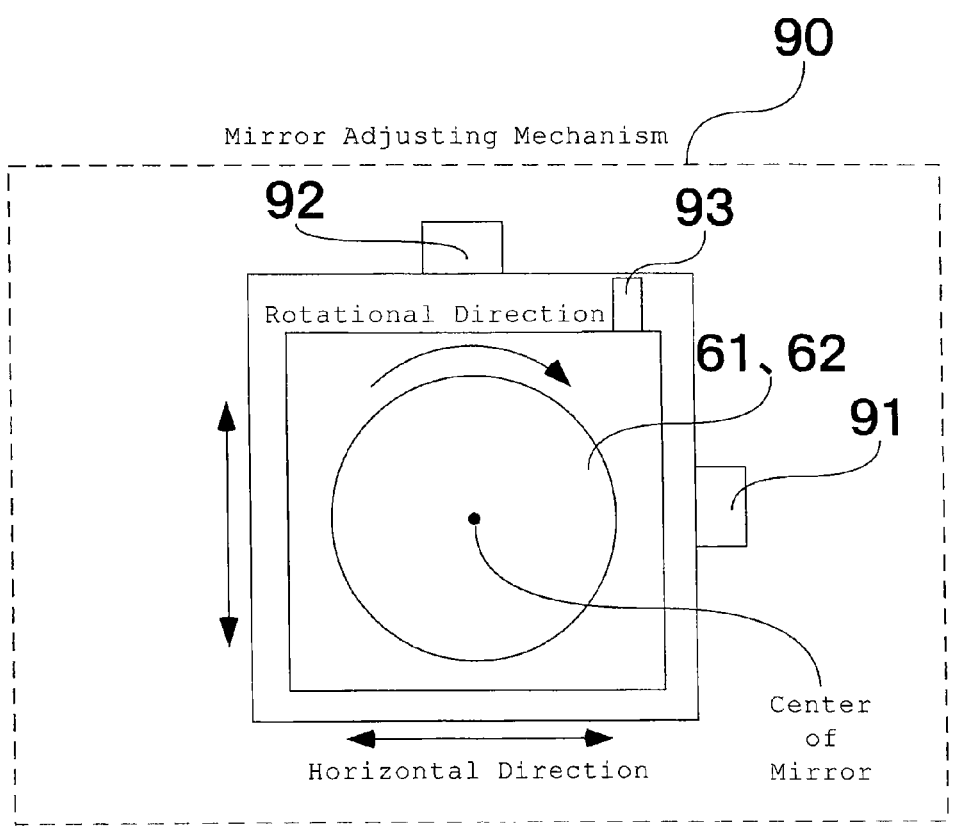
FIG. 8 is a structural view schematically illustrating a mirror adjusting mechanism according to a seventh embodiment of the present invention.

Note that, the convex mirror 61 having different curvatures in two orthogonal axes and the concave mirror 62 having different curvatures in two orthogonal axes of the above-mentioned first to sixth embodiments (FIG. 1 to FIG. 6) may be provided in a mirror adjusting mechanism 90 illustrated in FIG. 8.

In FIG. 8, the mirror adjusting mechanism 90 includes a mechanism that can move a fixed mirror in a horizontal direction and in a vertical direction and can rotate the fixed mirror within a mirror plane about a center of the mirror by using a horizontal direction adjustment screw 91, a vertical direction adjustment screw 92, and a rotational direction adjustment screw 93.

The convex mirror 61 and the concave mirror 62 each having different curvatures in two orthogonal axes have lower precision curvatures around edges thereof due to a problem of processing precision of a spherical surface, and thus it is desired to radiate the laser light L to the vicinity of centers thereof. However, a pass line of the laser light L changes depending on thermal loads of the transmission optical system and the oscillator and change in surrounding environments such as temperature and humidity.

Further, when an incidence plane of the laser light L deviates from an axis along which the curvature is designed, a beam has a shape of an ellipsoid of revolution, and the processing quality is lowered.

By the mirror adjusting mechanism 90 illustrated in FIG. 8, even if the pass line of the laser light L changes, the laser light L is radiated to centers of the convex mirror 61 and the concave mirror 62 each having different curvatures in two orthogonal axes, and the laser light can be transmitted without distortion of the beam shape. Note that, in this embodiment, the mirror adjusting mechanism 90 is a mechanism that carries out adjustment with the horizontal direction adjustment screw 91, the vertical direction adjustment screw 92, and the rotational direction adjustment screw 93, but a piezoelectric element may be used instead of a screw.

The invention claimed is:

1. A laser processing device, comprising:
    a laser oscillator for emitting laser light;
    a processing table for placing an object to be processed;
    a transmission optical system for transmitting the laser light emitted from the laser oscillator to the processing table;
    a processing head for condensing and radiating the laser light transmitted via the transmission optical system to the object to be processed; and
    moving means for changing a relative position between the object to be processed and the laser light to be radiated to the object to be processed,
    wherein the transmission optical system comprises:
        a reflective beam expander mechanism for collimating and magnifying the laser light from the laser oscillator; and
        a variable curvature spherical mirror,
    wherein the reflective beam expander mechanism comprises a spherical mirror and a mirror having different curvatures in two orthogonal axes, and
    wherein the variable curvature spherical mirror is placed between the spherical mirror and the mirror having different curvatures in two orthogonal axes.

2. A laser processing device according to claim 1, wherein the reflective beam expander mechanism comprises a spherical convex mirror and a concave mirror having different curvatures in two orthogonal axes.

3. A laser processing device according to claim 1, wherein the reflective beam expander mechanism comprises a spherical concave mirror and a convex mirror having different curvatures in two orthogonal axes.

4. A laser processing device according to claim 1, wherein the reflective beam expander mechanism comprises a convex mirror having different curvatures in two orthogonal axes and a concave mirror having different curvatures in two orthogonal axes.

5. A laser processing device according to claim 1,
    wherein the transmission optical system comprises an optical path length fixing mechanism,
    wherein the optical path length fixing mechanism comprises a mirror group including a plurality of mirrors and a moving mechanism for translating the mirror group,
    wherein the plurality of mirrors of the mirror group are placed so that a direction of travel of incident light to the mirror group and a direction of travel of output light from the mirror group are opposite and in parallel to each other, and
    wherein the moving mechanism translates the mirror group with respect to the direction of the travel of the incident light and the direction of the travel of the output light so as to cancel out change in relative position between the object to be processed and the laser light to be radiated to the object to be processed to maintain a fixed optical path length of the laser light radiated to the object to be processed.

6. A laser processing device according to claim 1, wherein the variable curvature spherical mirror is placed so as to be opposed to the spherical mirror in the reflective beam expander mechanism.

7. A laser processing device according to claim 1, wherein the reflective beam expander mechanism comprises a variable curvature mirror having changeable curvatures in two orthogonal axes.

8. A laser processing device according to claim 1,
    wherein the reflective beam expander mechanism comprises:
        a spherical convex mirror; and
        a concave mirror having different curvatures in two orthogonal axes,
    wherein the spherical convex mirror and the variable curvature spherical mirror are placed so as to be opposed to each other, and
    wherein the variable curvature spherical mirror and the concave mirror having different curvatures in two orthogonal axes are placed so as to be opposed to each other.

9. A laser processing device according to claim 1, further comprising a mirror adjusting mechanism comprising a mechanism for enabling adjustment in a vertical direction, in a horizontal direction, and in a rotational direction about centers of mirrors,
    wherein the concave mirror having different curvatures in two orthogonal axes and the convex mirror having different curvatures in two orthogonal axes are placed in the mirror adjusting mechanism.

* * * * *